(No Model.) 2 Sheets—Sheet 2.

A. G. BREWER.
GORE CUTTING MACHINE.

No. 527,588. Patented Oct. 16, 1894.

Witnesses:
A. D. Harrison
J. P. Davis

Inventor
A. G. Brewer
by Wright Brown Crossley
Attys.

UNITED STATES PATENT OFFICE.

ALBERT G. BREWER, OF HOPKINTON, MASSACHUSETTS.

GORE-CUTTING MACHINE.

SPECIFICATION forming part of Letters Patent No. 527,588, dated October 16, 1894.

Application filed January 30, 1894. Serial No. 498,435. (No model.)

*To all whom it may concern:*

Be it known that I, ALBERT G. BREWER, of Hopkinton, in the county of Middlesex and State of Massachusetts, have invented certain new and useful Improvements in Gore-Cutting Machines, of which the following is a specification.

The object of the present invention is to provide a machine by which elastic gores such as used in boot and shoe manufacture can be cut with accuracy and without abnormally distending the strands of rubber of which the stock is partially composed, such distension causing the rubber strands to withdraw into the stock upon being released, a difficulty constantly encountered in gore-cutting as at present practiced.

To the above ends, the invention consists in certain novel constructions and arrangements of parts whereby the stock is guided to the proper positions for severing it on the angles desired, and whereby the stock is cut in a manner to insure a clean severing of the rubber strands without distending the same.

The accompanying drawings illustrate a machine constructed in accordance with my invention.

Figure 1:
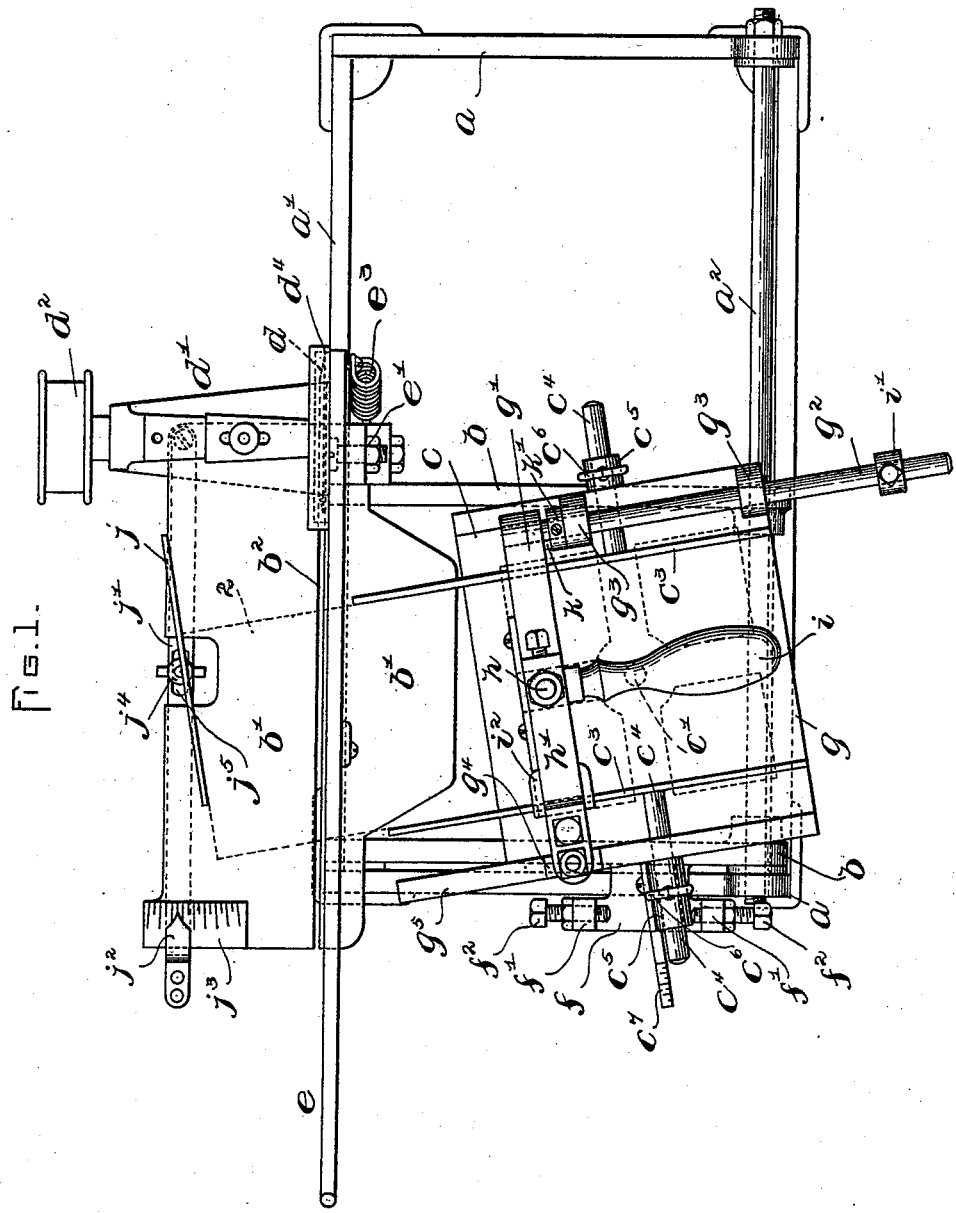
Figure 2:
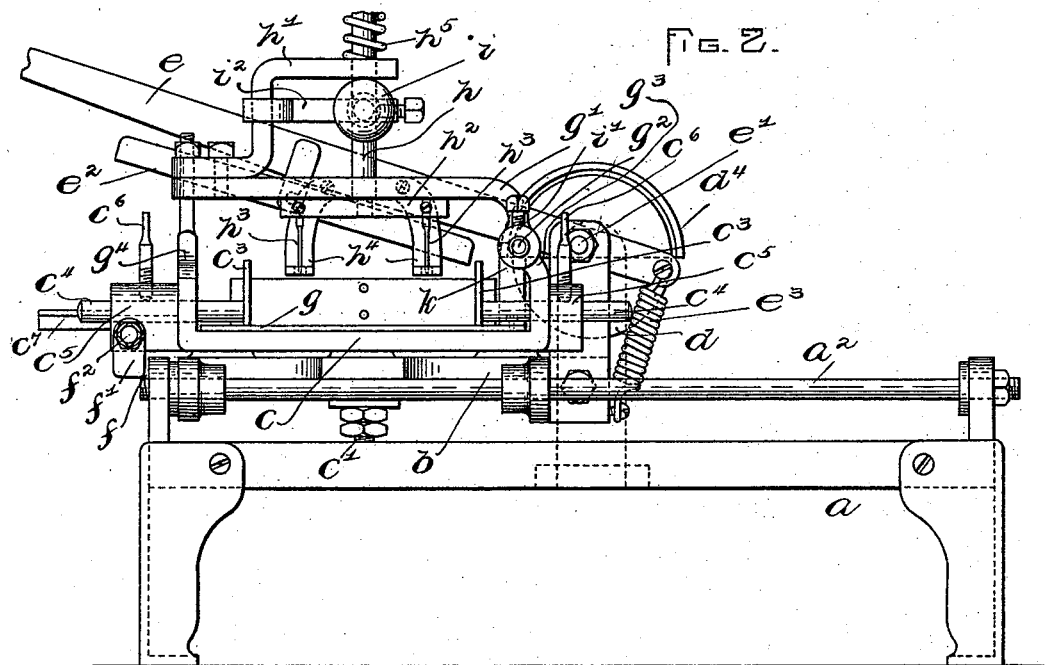
Figure 3:
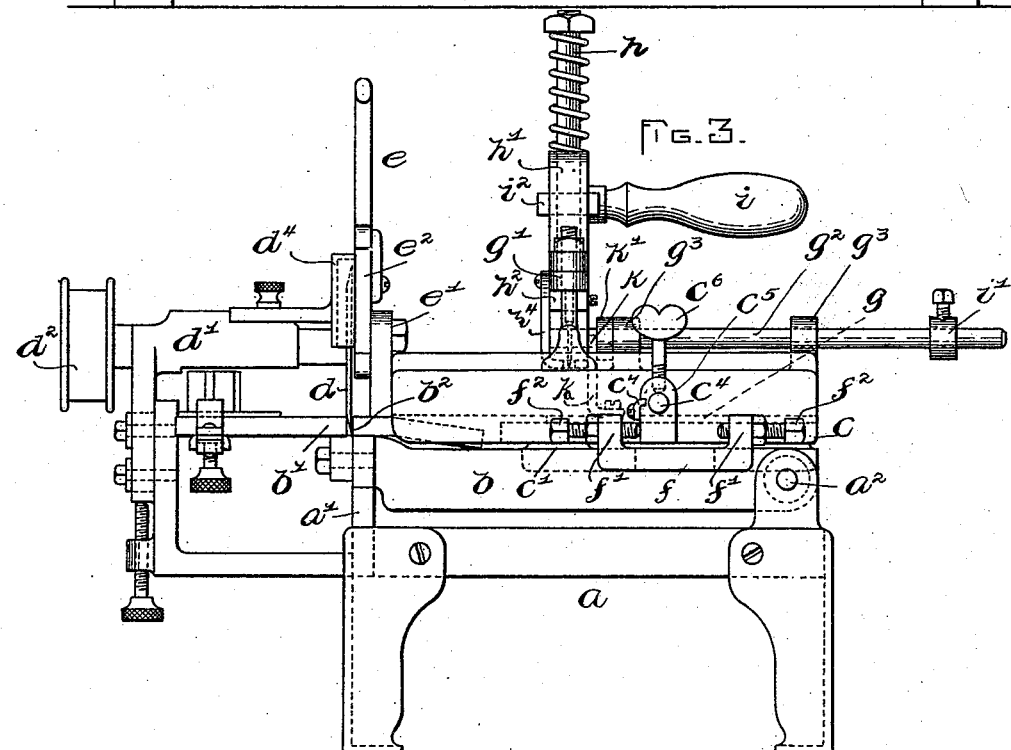

Figure 1 shows a top plan view of the machine. Fig. 2 shows an elevation as viewed from the lower side of Fig. 1. Fig. 3 shows an elevation as viewed from the left-hand side of Fig. 1.

The letter $a$ designates a stationary supporting frame having a longitudinal rail, $a'$, at one side, and a rod, $a^2$, at the opposite side and parallel with said rail.

$b$ designates a carriage having bearings which embrace said rod, and rollers resting on the rail, said carriage adapted to slide longitudinally. The carriage has a horizontally extending bed or platen, $b'$, on which the work is supported while being cut, and which is slotted transversely as shown at $b^2$. A circular knife, $d$, is supported in a stationary bearing, $d'$, and engages the slot, $b^2$, and said knife is constantly rotated during the operation of the machine, motion being imparted to it through the medium of a pulley, $d^2$, affixed to the knife-spindle. The stock is cut by causing the carriage, $b$, to travel on its ways, thereby subjecting the stock, 2, lying on the bed, $b'$, to the action of the rotating cutter, $d$. The progressive motion thus given to the work, combined with the rotation of the knife, produces a clean cut without stretching the rubber strands in the stock. The upper half of the knife is preferably covered by a shield, $d^4$. The carriage is reciprocated by means of a handle, $e$, which is pivoted to it at $e'$, and forms a lever which is made to act also as a presser for holding the stock upon the bed while being cut, said handle or lever supporting a presser-bar, $e^2$, on the under side, adapted to bear on the stock alongside the slot, $b^2$, when the lever is depressed, and said bar being pivoted to the lever so as to conform to the stock and clamp it throughout its extent across the table. A spring, $e^3$, holds the lever normally elevated, and the presser-bar raised from the table. (See Fig. 2.) The work, 2, is fed through a guide, $c$, swiveled on the carriage $b$, and is caused to assume the desired angular adjustment with respect to the slot, $b^2$, by oscillation of said guide on its pivot, $c'$.

Adjustable guiding-strips, $c^3$, are supported on the base of the guide $c$, and they may be adjusted to the stock by means of the following construction: Each of said strips is provided with a stem, $c^4$, which has a sliding engagement with a bearing, $c^5$, on the frame $c$, and may be locked at different adjustments by means of a set-screw $c^6$, in said bearing. A scale, $c^7$, is arranged alongside one of the stems, $c^4$, by which to determine the adjustment of the guide strips. A bracket, $f$ is secured to the carriage, $b$, and projects from the front side thereof, and is provided with up-standing arms, $f'$, extending on opposite sides of the bearing, $c^5$. Set-screws, $f^2$, entered through said arms, limit the movements of the guide, $c$, on its pivot, the bearing $c^5$ abutting said screws. By adjusting said screws, the extent of movement of the swiveled guide is determined.

The stock, in a stack of long strips, is introduced between the guide-pieces $c^3$, and rests on a movable plate, $g$, extending under said guide-strips. The stock is fed forward by the following devices: A bridge-piece, $g'$, is affixed to a rod, $g^2$, which extends through ears, $g^3$, on the guide-frame, $c$, and said bridge-piece extends across the strips $c^3$, and has a foot, $g^4$, resting on a rail, $g^5$, at the front side of the swiveled guide-frame and designed to slide thereon. A vertical spindle or stem, $h$, extends through the bridge and a bracket, $h'$, secured thereto; and a cross-head, $h^2$, fastened to the lower end of said stem carries a pair of awls, $h^3$, which extend through guides, $h^4$, fastened to the bridge. A spring, $h^5$, surrounding the stem and bearing at one end against a nut thereon, and at the other end against the bracket $h'$, holds the awls elevated. A handle, $i$, is affixed to the stem $h$ and projects horizontally therefrom. By depressing the said handle, the awls are caused to penetrate the stock, and then the handle is pushed forward to feed the stock across the table $b'$, the rod $g^2$ sliding through the ears $g^3$. The movement is limited by a collar, $i'$, on said rod $g^2$, abutting one of the ears $g^3$.

The stem $h$ is prevented from turning by an arm, $i^2$, affixed to it and having a bifurcated end embracing the bracket, $h'$. A plate, $j$, stands above the bed, $b'$, to form an abutment for the front end of the stock, and is centrally pivoted and free to swing and accommodate itself to the edge of the stock on whatever angle it may extend. This plate is mounted in a socket, $j^4$, adjustable in a slot, $j^5$, in a lever, $j'$, pivoted on the under side of the table, and may be adjusted to different widths of gores to be cut, by moving this lever, and to different angles of the gore-sides, by shifting the socket, $j^4$, in the slot, $j^5$, said socket adapted to be fixed at different adjustments by means of a set screw. The lever carries a finger, $j^2$, which projects over a scale, $j^3$, on the upper side of the table, so that the position of the plate, $j$, can be properly determined.

The operation of the machine may be described as follows: The guide-strips, $c^3$, are adjusted to properly engage the edges of the stock, and the screws, $f^2$, are adjusted to establish two predetermined positions of the swiveled guide, $c$, brought about by turning the latter on its pivot in opposite directions, these two positions of the guides determining the angles of the gore-sides. In the usual form of a gore, one side is cut at or nearly at right angles to the longitudinal edge of the stock, whereas the opposite side extends diagonally. Considering the end of the stock to have been squared off so as to form one side of a gore, and to be lying in the guide, $c$, the latter is turned to the angular position shown in Fig. 1, and the stock is thus disposed at an angle to the slot, $b^2$. The handle, $i$, is depressed and then advanced, and the stock carried over the bed $b'$ and against the plate, $j$, which adjusts itself to the edge of the stock. The lever, $e$, is depressed to bring the presser-bar upon the stock, and then by means of said lever the carriage is moved along its ways, subjecting the stock to the action of the rotating knife, $d$, which severs the stock on a diagonal line. The gores thus formed are removed, the carriage is returned to its initial position, and the guide is turned on its pivot to bring the longitudinal edge of the stock at right angles to the slot $b^2$. The stock is advanced and severed as before, being cut this time at right angles to its longitudinal edge.

It is to be noted that the handle, $j$, serves as a means to enter the awls through the stock, to feed the stock, and to turn the guide on its pivot. The base-plate, $g$, moves forward and back with the bridge-piece, $g'$, said plate having attached to it an arm, $k$, which projects up between the bridge and a collar, $k'$, on the rod $g^2$.

Having thus described my invention, what I claim as new, and desire to secure by Letters Patent, is—

1. A machine of the character described comprising in its construction a stationarily located cutter, a work-supporting carriage arranged to slide longitudinally thereof, and a swiveled work-guide on said carriage.

2. A machine of the character described, comprising in its construction a traveling work-supporting bed, a presser-foot carried thereby, a handle which controls the said supporting bed and the presser-foot, and a stationarily supported cutter.

3. A machine of the character described, comprising in its construction a slide-way, a carriage thereon having a work-supporting bed with a slot extending in the direction of the carriage's movement on its slide-way, a work-guide swiveled on said carriage, and a stationarily supported cutter in line with the slot, substantially as and for the purpose described.

4. A machine of the character described, comprising in its construction a swiveled work-guide, a sliding carrier thereon, and an awl or awls carried by a vertically movable holder on said carrier, said holder having a suitable handle.

5. A machine of the character described, comprising in its construction a supporting table, a swiveled work-guide, a stop-plate freely pivoted to an adjustable support, and cutting devices, substantially as described.

6. A machine of the character described, comprising in its construction a supporting table, a cutter arranged to cut on a fixed line of said table, a pivoted arm adjustable toward and from the cutting line of the table, a bearing adjustable in a slot of said arm, a stop-plate pivoted in said bearing and standing above the table, and a swiveled work-guide.

In testimony whereof I have signed my name to this specification, in the presence of two subscribing witnesses, this 22d day of January, A. D. 1894.

ALBERT G. BREWER.

Witnesses:
E. L. BREWER,
F. A. MORRILL.